United States Patent [19]
Szatkowski

[11] 3,947,165
[45] Mar. 30, 1976

[54] APPARATUS FOR MAKING TUBULAR CONTAINERS

[75] Inventor: Richard R. Szatkowski, Western Springs, Ill.

[73] Assignee: Continental Can Company, Inc., New York, N.Y.

[22] Filed: Apr. 24, 1974

[21] Appl. No.: 463,599

Related U.S. Application Data

[62] Division of Ser. No. 304,443, Nov. 7, 1972, Pat. No. 3,833,692.

[52] U.S. Cl. ............... 425/3; 425/425; 425/433; 425/435; 264/24; 264/309
[51] Int. Cl.² ............ B29C 5/00; B29D 23/00
[58] Field of Search ....... 425/472, 3, 425, 433, 435; 264/24, 309

[56] References Cited
UNITED STATES PATENTS

| | | | |
|---|---|---|---|
| 2,904,836 | 9/1959 | Jefferson et al. | 425/433 |
| 3,187,381 | 6/1965 | Britten | 264/309 X |
| 3,239,906 | 3/1966 | Ribot | 425/433 |
| 3,491,170 | 1/1970 | Roe, Jr. | 264/24 |
| 3,660,547 | 5/1972 | Ruckberg | 264/24 |

*Primary Examiner*—Robert L. Spicer, Jr.
*Attorney, Agent, or Firm*—Diller, Brown, Ramik & Wight

[57] ABSTRACT

An apparatus and method for making seamless tubular containers having a first end terminating in a shoulder and threaded neck of a reduced diameter with increased wall thickness and a second open end. The process uses a mold having an internal surface configuration corresponding to the external configuration of the desired tubular container. Suction means draws electrostatically charged powder through the mold and permits a portion thereof to deposit on the internal surface, the amount of deposition being partially controlled by the surface configuration. Subsequently, the container is heated to fuse the deposited powder into homogeneous mass, while subsequent cooling permits shrinking of the container away from the mold walls such that it may be removed by hand or by mechanical apparatus.

7 Claims, 4 Drawing Figures

U.S. Patent   March 30, 1976   3,947,165
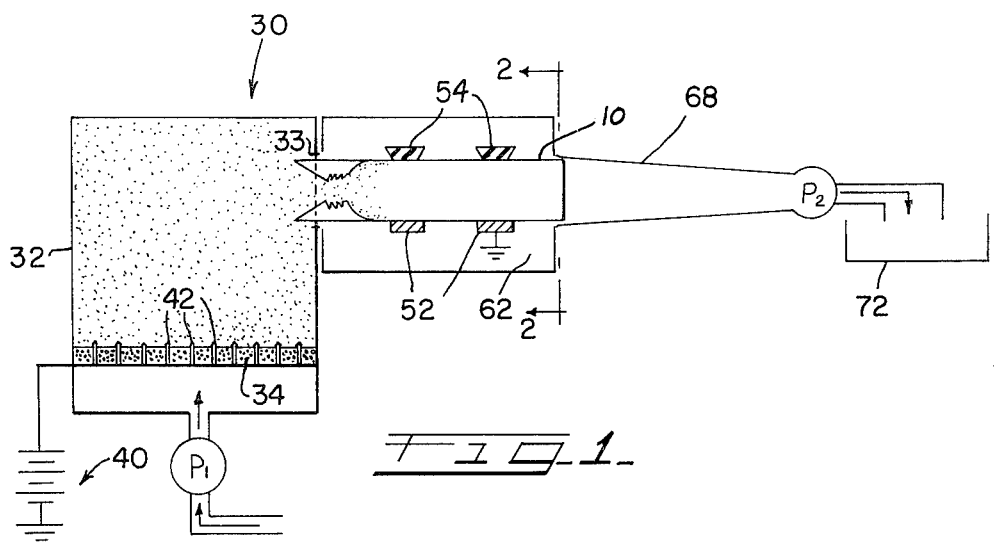
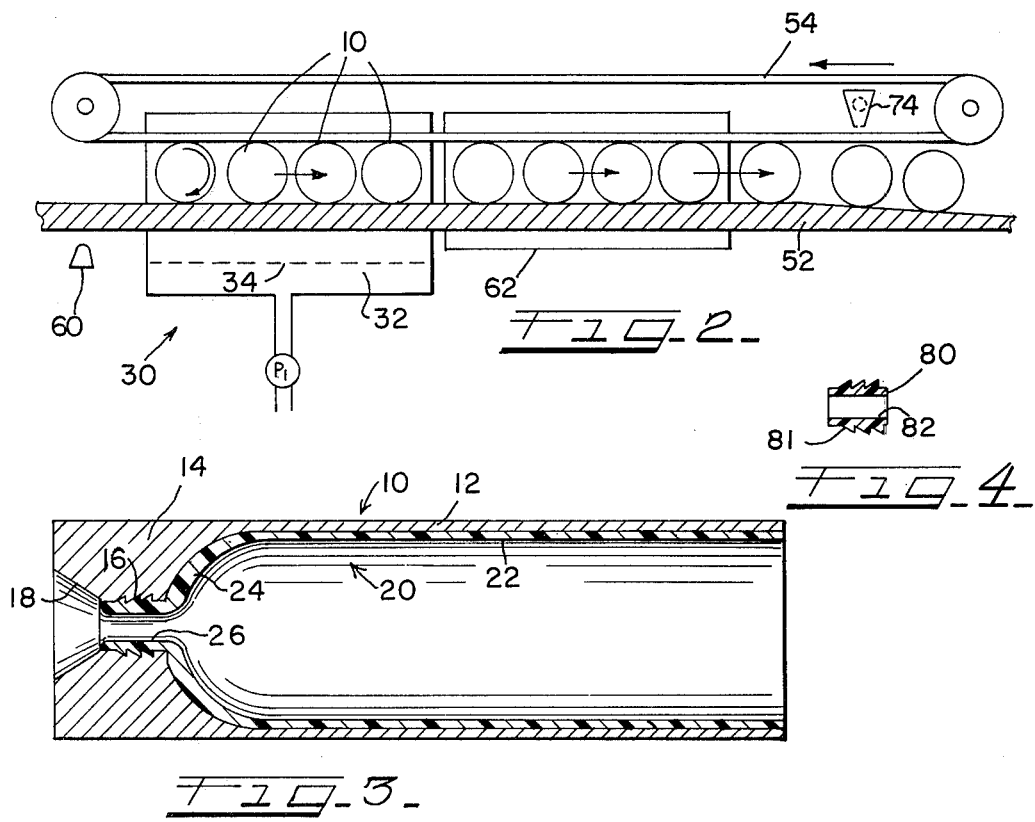

APPARATUS FOR MAKING TUBULAR CONTAINERS

This is a division of Ser. No. 304,443, filed Nov. 7, 1972, now U.S. Pat. No. 3,833,692.

BACKGROUND OF THE INVENTION

This invention relates to the manufacture of flexible collapsible tubes for packaging cosmetics and toiletry products such as lotions, toothpaste, etc. Such tubes are generally cylindrical, having a shoulder terminating in a threaded end adapted to receive a closure. The other end remains open for filling and is subsequently closed by heat sealing or other means. More specifically, this invention relates to a method and apparatus for manufacturing seamless, integral tubular containers by electrostatic deposition of a powder on a mold and subsequent sintering of the powder into a fused homogeneous mass.

In the past, the commercial manufacture of such tubes has been accomplished by injection molding, or by the extrusion of a tubular parison with subsequent welding of a shoulder and threaded neck portion to the extruded parison. With respect to the manufacture of these containers by injection molding, such requires large capital expenditures including investment in expensive two-piece molds, presses, and an extruder for the polymeric material. On the other hand, where tubular parisons are made, such requires an extruder to provide a cylindrical tube of polymeric material which is subsequent cooled and cut into the desired lengths. After the cylindrical tubes have been cooled, they are welded in some fashion to a shoulder and neck portion which is adapted to receive a closure, the shoulder and neck portion being previously formed by injection molding. Both of these processes are expensive, require the employment of additional undesirable manufacturing steps and do not permit a higher rate of production which is desirable.

SUMMARY OF THE INVENTION

In order to overcome the disadvantages of the prior art, the preferred embodiment of the instant invention utilizes an electrostatic fluidized bed of a polymeric material. A unitary mold having the desired internal configuration is placed adjacent this fluidized bed. Suction means are utilized to draw an electrically charged polymeric powder through a mold having a different electrical potential so as to cause powder deposition on the mold surfaces. By placing the reduced section of the mold adjacent the fluidized bed, the powdered particles are passed through a narrow orifice at a high velocity, and upon reaching the enlarged diameter of the mold, the powder immediately decelerates so that the particles may be more easily attracted to the side walls of the mold. Additionally, the passing of the powder through the orifice of the mold creates a turbulence which, with the decrease in velocity, produces a greater deposition of powder in the shoulder portion of the mold such that the finished container has a thicker cross-section in this area. Subsequent heating apparatus is utilized to fuse the powder into a homogeneous mass and a final step of cooling permits removal of the sintered container from the mold. After manufacture of the container, a closure is placed upon the neck portion, and filled through the open end which is then sealed.

Accordingly, it is an object of the instant invention to provide an apparatus and method for manufacturing tube-like containers which requires low capital investment and yet permits a very high rate of production. Another object of this invention is to provide a tube-like container requiring fewer manufacturing steps, and to provide a method and apparatus which permits the manufacture of such containers in a continuous manner. Too, the object of the instant invention is to produce a container having a seamless external shape so as to improve the appearance and processing thereof. Finally, it is an object of the instant invention to provide a container made by electrostatic powder deposition in which the wall thickness of the size of the container may be controlled and varied by effecting changes in the velocity of the powder particles, and turbulence of the powder flow as they pass through the mold.

DESCRIPTION OF THE DRAWINGS

The manner in which the objects of this invention is attained will be made clear by consideration of the following specification and claims when taken in conjunction with the drawings in which:

FIG. 1 is a side elevational view of the preferred embodiment of the instant apparatus and process in schematic form;

FIG. 2 is an elevational view taken along the lines 2—2 of FIG. 1;

FIG. 3 is a side elevational view in section of a mold which may be utilized in conjunction with the preferred embodiment of FIGS. 1 and 2 and discloses a container formed therein; and FIG. 4 is a side elevational view in section of a thermoplastic insert which may be threadably engaged with the mold of FIG. 3 to further enhance the preferred embodiment of my process.

DETAIL DESCRIPTION

In the preferred embodiment of my invention, a metallic mold is exposed to an electrostatic fluidized bed, which provides a supply of thermoplastic powder, with vacuum means being provided to draw a thermoplastic powder through the mold. A reduced opening at the end of the mold adjacent the fluidized bed causes the powder velocity to decrease upon entering the mold and effects turbulence of powder particles within the mold such that its deposition to the internal wall portions of the mold is enhanced. Subsequently, the molds are conveyed by belts or other means through a heating device such as a gas oven or an induction heater to sinter the powder into a fused homogeneous mass. After sintering, fluids or other means are utilized to cool the molds such that the finished tubular container can be removed.

With reference to the preferred embodiment of the mold 10 of FIG. 3, such may take the form of an elongated cylindrical member 12 having a reduced cross-sectional area 14 at the forward end thereof which forms a shoulder of the finished container. This reduced area 14 terminates in a threaded section 16 for forming a threaded neck portion. Forward of the threaded section is a frusto-conical opening 18 through which powder is drawn through the mold. With further reference to FIG. 3, such depicts a finished container 20 already formed therein. The container comprises a cylindrical section 22 which terminates forwardly in a shoulder section 24 joined to a threaded neck section 26. As later explained, electrostatically charged polymeric powder will be drawn through the mold of FIG. 3 from left to right as viewed in the drawings. Since such powder must enter through the threaded area 16 which, in effect, represents an orifice of relative small cross-section, the powder and the fluid conveying it must pass at a relatively high velocity. In this area, the threads will create sufficient turbulence to cause deposition of powder to form the neck portion. As the polymeric powder enters the larger diameter, cylindrical portion 12 of the mold, the velocity of the powder particles abruptly decrease. Too, turbulence is created adjacent the surface of the mold rearwardly of the threaded section area 16 resulting in a greater deposition of powder on the reduced area 14 than on the remainder of the mold 10. After deposition, the mold is ready for heating such that the material may be fused into homogeneous mass while subsequent cooling will permit the shrinking of the fused thermoplastic material away from the interior walls of the mold 10 such that it can be removed as an integral seamless container. Alternatively, the mold might be coated with a release agent.

This process of making the tube-like container can be more thoroughly understood with reference to FIG. 2. As shown the molds 10 are carried on fixed supports 52, one of which is preferably grounded so that the molds will have no electrical charge. The molds are placed upon the left end of the supports 52 as viewed in FIG. 2 while belts 54 above the supports 52 moving in the direction indicated by arrows will cause the molds to rotate and to traverse the supports from left to right. At the left end of the supports 52, the molds 10 are heated by a preheater 60 which may be flame burners or other appropriate heating means. Subsequently, the molds are carried across the fluidized bed 30 which is more fully depicted in FIG. 1.

The electrostatic fluidized bed 30 may comprise a container 32 having an opening 33 in the side wall adjacent which is placed the front end of the mold 10. The lower portion of the container 32 has a porus member 34 upon which the polymeric powder is placed. A pump P1 then delivers a fluid such as air or an inert gas through the porous material to fluidize the powder within the container. At the same time, a source of electrical energy 40 provides an electrical charge to the particles of powder through the corona tips 42. As the molds 10 are conveyed across the width of the container 32, they are also exposed to a funnel shaped member 68 which is attached to a pump P2, the latter creating a suction effect to draw the fluidized powder through the molds 10. As previously explained, the particles of powdered material will enter the front end of the mold at a relatively high velocity, with the threads creating turbulence so as to cause the powder to be deposited thereon. Additionally, as the powdered material enters into the enlarged diameter section of the mold, the velocity is decreased and the turbulent flow will cause a greater deposition of the powdered material at the shoulder portion 24 which extends between the threaded section of the mold 10 and the cylindrical body portion 12. Thereafter the powder is relatively evenly distributed upon the remaining portion of the internal wall section of the mold 10. Preferably, one of the supports 52 is grounded as indicated in FIG. 1 so as to create the electrical potential difference between the powder entering the mold and the mold itself such that the particles will be more strongly attracted to the surfaces of the mold 10. Excess powder which is not deposit on the mold is then carried by the pump P2 into a collecting container 72.

As viewed in FIG. 2, the molds 10 after leaving the fluidized bed 30 are conveyed through an oven 62 such that the powdered material may be sintered into homogeneous mass. Upon leaving the oven, the molds are sprayed with water from a spray device 74, or cooled in any other conventional manner. Subsequently, the conveyor belts 54 transfer the cooled molds to a collecting point or to another apparatus for removing the formed container from the mold.

The polymeric powder which may be utilized to form the tube-like container may be polyethylene, polypropylene or other plastic materials which are suitable for electrostatic deposition. In selecting the powder, consideration should be given to the desired properties of the container, and the product to be packaged. Additionally, it was within the scope of my invention to pass the molds across a fluidized bed having a mixture of different polymeric materials, or to pass the molds through separate fluidized beds containing different powders.

Finally, reference should be made to FIG. 4 which depicts an insert 80 having a cylindrical shape with threads 81 on its exterior surface. This insert may be appropriately threaded into the mold threads 16 by mechanical means prior to the electrostatic deposition of powder. Such will insure that the neck portion has sufficient strength to receive a threaded closure for the container. During the deposition process, some material will be deposited on its inner surface 82 as well as the rear end thereof so as to insure an integral attachment to the shoulder 24 of the container upon fusing within the oven 62.

Accordingly, I have disclosed an inexpensive apparatus for making seamless tube-like containers which will have a very desirable external appearance and which can be manufactured in a continuous manner at relatively high production rate. The molds are a one-piece construction and are easily manufactured by conventional screw machine operations to avoid the otherwise high cost of injection molds and the use of extruders. Additionally, my invention includes the manufacture of various tubular devices having wall sections with varying thickness, since the utilization of an orifice and the creation of turbulence can be employed to effect this result.

I claim:

1. An apparatus for making tubular containers with each container having an open end and another end including a shoulder of decreasing diameter and a neck portion, said apparatus comprising:
   a. support means;
   b. a mold carried by said support means and having an internal surface corresponding to the external configuration of the to-be-formed container including a decreased diameter portion;
   c. a supply of powdered polymeric material adjacent said support means and the decreased diameter portion of said mold; and
   d. combined pump means and electrostatically charging means adjacent said mold for causing said powdered material to generally pass through said mold, and effecting deposition of a portion of said powdered material on said mold internal surface with a variable thickness.

2. An apparatus as recited in claim 1 in which:

a. said mold is of unitary construction.

3. An apparatus for making seamless tubular containers having first and second ends, said first end including a shoulder and neck of reduced diameter and increased wall thickness, said apparatus comprising:
   a. a hollow mold having an internal configuration corresponding to the external configuration of said tubular container, said mold having first and second ends each of which is open and said internal configuration including a shoulder and a reduced diameter portion;
   b. a supply of powdered polymeric material, said powdered polymeric material having a different electrical potential than said mold;
   c. flow means for operative association with said mold and for causing said powdered material to generally flow through said mold with a portion of said powder forming a deposit upon the internal surface thereof, said powdered material flow extending in a direction from the mold first end to the mold second end with the reduced diameter portion of said mold effecting a velocity decrease of the powdered material and said velocity decrease in combination with said electrically potential difference functioning to increase the deposition of powdered material in the vicinity of said shoulder; and
   d. fusing means for fusing the deposited powdered material into a homogeneous mass conforming to the shape of the mold surface.

4. An apparatus according to claim 3 together with support means for positioning said mold relative to said flow means and determining a path of movement of said mold relative to said flow means, said flow means extending along said path of movement a distance in excess of one mold width, and said support means including conveyor means for moving said mold along said path relative to said flow means during the operation of said flow means.

5. An apparatus according to claim 4 wherein said support means also includes a fixed support and said conveyor means is spaced from said fixed support for effecting rolling of said mold along said fixed support.

6. An apparatus according to claim 5 wherein fusing means is positioned adjacent said flow means for cooperation with a rolling mold.

7. An apparatus according to claim 3 wherein said fusing means includes a mold preheater in advance of said flow means.

* * * * *